United States Patent Office 3,468,945
Patented Sept. 23, 1969

3,468,945
PRODUCTION OF CARBOXYLIC ACIDS
AND NITRILES
David A. Edwards, Oxford, Eric B. Evans, Steventon, and Benjamin T. Fowler, Abingdon, England, assignors to Esso Research and Engineering Company, a corporation of Delaware
No Drawing. Filed Sept. 15, 1965, Ser. No. 487,581
Claims priority, application Great Britain, Sept. 25, 1964, 39,235/64
Int. Cl. C07c 51/26, 121/02
U.S. Cl. 260—531    9 Claims

ABSTRACT OF THE DISCLOSURE

Organic carboxylic acids and nitriles are prepared by oxidizing primary alcohols or amines in the presence of a cobalt oxide catalyst of a higher oxidation state than cobalt monoxide. Preferably, the reaction is conducted in an aqueous alkaline medium. Desirably, the cobalt catalyst is generated in situ by the oxidation of a water-soluble cobalt salt.

---

The invention relates to the production of carboxylic acids by the oxidation of primary alcohols and also relates to the production of nitriles by the oxidative dehydrogenation of primary amines.

It is an object of the present invention to provide a new process for making acids and nitriles from the corresponding primary alcohols and amines. Another object of the invention is to provide a process permitting the conversion of primary alcohol groups into carboxylic acid groups and/or the conversion of primary amino groups into nitrile groups by means of oxidation. A further object of the invention is the use of cobalt oxide in the oxidation of primary alcohols, glycols, glycol ethers and amines with formation of the corresponding carboxylic acids or nitriles. Still further objects will appear hereinafter.

The above and other objects are accomplished in accordance with the present invention by contacting a primary alcohol group or primary amino group-containing organic compound with a cobalt oxide of higher oxidation state than cobalt monoxide.

It has been found according to the present invention that primary alcohols, glycols, glycol ethers and other organic compounds containing the —$CH_2OH$ group are converted into the corresponding carboxylic acids when contacted with a cobalt oxide of higher oxidation state. The reaction is preferably carried out in an aqueous medium under alkaline conditions and involves the oxidation of the —$CH_2OH$ groups present in the starting material to —COOH groups. Similarly, it has been found according to this invention that contacting of primary amines with cobalt oxide of higher oxidation state than cobalt monoxide results in the formation of nitriles due to an oxidation of the —$NH_2$ groups present to —C≡N groups.

A cobalt oxide of higher oxidation state than the monoxide can be prepared by the alkaline oxidation of freshly prepared cobalt monoxide (CoO) or cobaltous hydroxide ($Co(OH)_2$) with a suitable oxidising agent e.g. an alkali hypochlorite or persulfate, and then used as such, in the presence of such oxidising agent, to oxidise the alcohol or dehydrogenate the amine. Preferably however, the cobalt oxide is generated in situ in the reaction mixture by the action of an alkali hypochlorite (or other suitable oxidising agent) on an aqueous solution of a cobalt salt. The oxidising agent oxidises cobalt ions in the solution to the cobalt oxide of higher oxidation state than the monoxide. The cobalt oxide then oxidises the alcohol or amine and is continuously regenerated in a freshly prepared condition by additional hypochlorite (or other suitable oxidising agent).

The process of the invention is applicable to all organic compounds containing at least one —$CH_2OH$ group per molecule. Representative examples of suitable mono- and poly-hydric alcohols which can be converted into the corresponding carboxylic acids by the process of this invention include primary alcohols, such as n-butanol-1, dihydric alcohols, such as ethylene and propylene glycols, and glycol ethers, such as diethylene glycol, tetraethylene glycol and the monoalkyl ethers of these compounds.

It has moreover been found that oxidation of glycol monoethers of di-primary di- or poly-glycols by means of the cobalt oxide of higher oxidation state than cobalt monoxide in accordance with this invention gives high yields of the corresponding mono- or di-carboxylic acid without causing any appreciable breakdown of the ether links of the glycol chain. Other methods of oxidising primary alcohols to carboxylic acids when applied to such glycol mono-ethers or di-primary alcohols often lead to break-down of the ether links of the glycol chain or to poor yields of the desired acid. In some cases it is impossible to separate any product from the residue of the oxidising agent used. In the method of the present invention the cobalt oxide remaining after the reaction is easily removed by filtration from the products of the reaction and can easily be re-used.

The process of the invention is preferably carried out in an aqueous alkaline medium, the alcohol or amine being dissolved or dispersed in the medium.

When a carboxylic acid is produced, it can be isolated by filatration to remove cobalt oxide followed by addition of mineral acid to the filtrate to liberate the carboxylic acid from its salts. The carboxylic acid may then be separated by filtration (if insoluble), by solvent extraction, by distillation, or by any other applicable method.

When a nitrile is produced, it can be isolated by filtration to remove cobalt oxide, followed by solvent extraction, distillation or any other applicable method.

If the oxidation were to be carried out with the pre-formed cobalt oxide, separated from and in the absence of the oxidising agent used to prepare it, such as hypochlorite, the molar ratio of cobalt oxide to alcohol or amine would have to be such as to provide at least 2 atoms of available oxygen per primary alcohol or amine group therein, to convert the alcohol or amine to acid or nitrile respectively. The available oxygen is the oxygen present in the cobalt oxide which is available for oxidation. This can be determined by measuring the amount of iodine liberated by an accurately known weight of the cobalt oxide added to a solution of potassium iodide in aqueous acetic acid. The available oxygen contained in the freshly prepared cobalt oxide varies from 0.001 to 0.01 gm. atom per gm., corresponding to a total oxygen content represented approximately by $CoO_{1.1}$ to $CoO_{1.9}$ assuming that all the oxygen in excess of the monoxide CoO is available oxygen. Typical values for the available oxygen are from 0.0050 to 0.0062 gm. atom per gm., corresponding approximately to $CoO_{1.4}$ to $CoO_{1.5}$ on the same assumption. Thus at least 200 gm. of a cobalt oxide containing 0.005 gm. atom of available oxygen per gm. (corresponding approximately to $CoO_{1.4}$) would be required to oxidise each gm. molecule of a monohydric alcohol to the corresponding carboxylic acid.

If, however, the oxidation is carried out with a cobalt oxide generated in situ, or with the pre-formed cobalt oxide in the presence of the oxidising agent used to prepare it, such as hypochlorite, then much smaller amounts of the oxide can be used, e.g. such as to give a ratio of only 0.02 to 0.2 atom of cobalt per primary alcohol or amine group in the alcohol or amine. Thus, making the same assumption concerning available oxygen, only about 1.6 to 16 gm. of a cobalt oxide having a total oxygen content corresponding to $CoO_{1.4}$ need be used per gm. molecule of a monohydric alcohol. In such circumstances, the mobalt oxide provides only a small proportion of the oxygen for oxidising the alcohol (or dehydrogenating the amine), the major source of oxygen being the hypochlorite, or other oxidising agent present, which continuously regenerates the cobalt oxide until no further oxygen is available. The cobalt oxide thus functions largely as a catalyst in the oxidation of the alcohol or dehydrogenation of the amine.

After carrying out the process of the invention, the spent cobalt oxide which remains in the reaction mixture may be easily separated physically, e.g. by filtration, and may be easily regenerated (if desired) with further alkali hypochlorite, or other suitable oxidising agent, and re-used.

An ester of a carboxylic acid produced in accordance with the invention can be formed by esterification with the alcohol, from which the acid was originally obtained by oxidation. This may be accomplished by the partial oxidation of the alcohol to the acid and subsequent acidification of the reaction mixture to initiate the esterification reaction. Partial oxidation can be achieved by limiting the amount of oxygen available from the cobalt oxide or from the auxiliary oxidising agent, e.g. hypochlorite, to less than 2 atoms of available oxygen per primary alcohol group or by limiting the reaction time.

The nature of the invention will be further illustrated by the following examples:

Example I

To a solution of 50 g. (.026 mole) of tetraethylene glycol and 22 g. of sodium hydroxide in 800 g. of 10% (wt./wt. available chlorine) sodium hypochlorite solution, was added 5 g. (0.021 mole) of cobaltous chloride $(CoCl_2 \cdot 6H_2O)$ with stirring and the reaction was allowed to proceed at 30 to 40° C. for 5 h., when it was stopped by filtering off the remaining cobalt oxide. The filtrate was then titrated with concentrated hydrochloric acid, the amount of carboxylic acid present being estimated from the height of the step in the curve of pH plotted against titre and found to be approximately 0.23 mole, representing a yield of about 90% (52 g.) of the dicarboxylic acid:

$$HOOC \cdot CH_2(OCH_2CH_2)_2OCH_2 \cdot COOH$$

Example II 20 g. (0.15 mole) of "Carbitol" (mono-ethyl ether of diethylene glycol), 7.5 g. sodium hydroxide dissolved in 10 g. water, and 220 g. of 10% sodium hypochlorite solution were stirred together at 25° C. until complete solution was effected. Then a solution of 2 g. (0.0084 mole) of cobaltous chloride in 10 g. of water was added, the temperature of the reaction mixture being allowed to rise to 45–50° C. and maintained at this temperature for 5 h. At the end of this period, the cobalt oxides were filtered off, unreacted Carbitol was extracted from the filtrate with ether, the remaining filtrate was acidified with concentrated hydrochloric acid and the desired product was extracted with ether. On evaporation 19 g. (0.13 mole) of 2-ethoxy-ethoxyacetic acid was obtained, representing a yield of 86%.

Example III

The procedure of Example II was repeated but instead of the solution of cobaltous chloride there was used 1 g. (about 0.0112 mole) of a freshly prepared, dry cobalt oxide, prepared by a adding 10% sodium hypochloride solution to an aqueous solution of cobaltous chloride, stirring at 20° C. for 5 h., and separating the cobalt oxide by filtration. When freshly prepared, the oxide containing, e.g. 0.0062 g.-atom of available oxygen per g., corresponding to a total oxygen content represented by $CoO_{1.5}$. In this example, 8.2 (0.55 mole) of 2-ethoxy-ethoxyacetic acid were obtained, representing a yield of 37%.

Example IV

The procedure of Example II was repeated, but using 7 g. (0.095 mole) n-butanol (instead of 20 g. Carbitol), 4.2 g. sodium hydroxide, 150 g. 10% sodium hypochlorite and 1 g. (0.0042 mole) of cobaltous chloride. In this example, 6.5 g. (0.074 mole) of butyric acid was obtained, representing a yield of 78%.

Example V

Example IV was repeated using 1 g. of dry cobalt oxide, prepared as in Example III, instead of cobaltous chloride solution. In this example, 5.7 g. (0.065 mole) of butyric acid were obtained, representing a yield of 68%.

In the above examples, the amount of cobalt used was such as to provide the proportion of cobalt atoms to primary alcohol groups given by the following table:

| Example | Moles alcohol | No. of alcohol groups in alcohol | G. atoms cobalt | Atoms cobalt per alcohol group |
|---------|---------------|-----------------------------------|-----------------|-------------------------------|
| I       | 0.26          | 2                                 | 0.021           | 0.040                         |
| II      | 0.15          | 1                                 | 0.0084          | 0.056                         |
| III     | 0.15          | 1                                 | 0.0112          | 0.075                         |
| IV      | 0.095         | 1                                 | 0.0042          | 0.044                         |
| V       | 0.095         | 1                                 | 0.0112          | 0.118                         |

What is claimed is:

1. A process for preparing carboxylic acids or nitriles which comprises contacting an organic compound selected from the group consisting of compounds having at least one primary alcohol group or primary amino group per molecule with a cobalt oxide catalyst of higher oxidation state than cobalt monoxide, said contacting being conducted in an aqueous medium.

2. The process of claim 1 wherein said contacting is conducted in an aqueous alkaline medium.

3. The process of claim 2 wherein said cobalt oxide catalyst is generated in situ by contacting a water-soluble salt with an oxidizing agent.

4. The process of claim 3 wherein said oxidizing agent is selected from the group consisting of alkali hypochlorites and alkali persulfates.

5. The process of claim 4 wherein said oxidizing agent is an alkali hypochlorite.

6. The process of claim 2 wherein said organic compound is an alcohol containing at least one —$CH_2OH$ group per molecule.

7. The process of claim 6 wherein said primary alcohol is tetraethylene glycol.

8. The process of claim 6 wherein said alcohol is the mono-ethyl-etherethylene glycol.

9. The process of claim 6 wherein said alcohol is n-butanol.

References Cited

UNITED STATES PATENTS

| 3,192,258 | 6/1965  | Nakagawa et al. | 260—531  |
| 3,226,390 | 12/1965 | Nakagawa et al. | 250—524  |
| 3,361,805 | 1/1968  | Fernholf et al. | 260—530  |
| 3,225,080 | 12/1965 | Nakagawa et al. | 260—465.1 |
| 1,985,769 | 12/1934 | Dreyfus         | 260—531  |
| 2,388,218 | 10/1945 | Olin            | 260—465.1 |

LORRAINE A. WEINBERGER, Primary Examiner

D. STENZEL, Assistant Examiner

U.S. Cl. X.R.

260—465.1, 484